United States Patent [19]
Hirakawa

[11] Patent Number: 4,904,070
[45] Date of Patent: Feb. 27, 1990

[54] TELEPHOTO LENS SYSTEM

[75] Inventor: Jun Hirakawa, Tokyo, Japan

[73] Assignee: Asahi Kogaku Kogyo Kabushiki Kaisha, Tokyo, Japan

[21] Appl. No.: 311,917

[22] Filed: Feb. 17, 1989

[30] Foreign Application Priority Data

Feb. 19, 1988 [JP] Japan ................... 63-36624

[51] Int. Cl.$^4$ .............................. G02B 13/02
[52] U.S. Cl. ................................... 350/454
[58] Field of Search ............... 350/454, 455, 456, 463, 350/464

[56] References Cited

U.S. PATENT DOCUMENTS

| 4,518,229 | 5/1985 | Yasukuni | 350/454 |
|---|---|---|---|
| 4,534,626 | 8/1985 | Mihara | 350/454 |
| 4,556,295 | 12/1985 | Okudaira | 350/454 |
| 4,709,998 | 12/1987 | Yamanashi | 350/454 |
| 4,812,026 | 3/1989 | Iima | 350/454 |

FOREIGN PATENT DOCUMENTS

| 55-39803 | 10/1980 | Japan . |
|---|---|---|
| 58-82217 | 5/1983 | Japan . |
| 60-418 | 1/1985 | Japan . |
| 60-59569 | 12/1985 | Japan . |
| 61-12246 | 4/1986 | Japan . |
| 62-24209 | 2/1987 | Japan . |

*Primary Examiner*—Scott J. Sugerman
*Attorney, Agent, or Firm*—Sughrue, Mion, Zinn, Macpeak & Seas

[57] ABSTRACT

A compact high-performance telephoto lens system that has an aperture ratio of approximately 1:4 to 1:4.5, a half viewing angle of approximately 2° to 3° and a telephoto ratio of approximately 0.8. The lens system satisfies the following conditions:

$$0.4f < f_I < 0.8f \quad (1)$$

$$\nu_1, \nu_3 > 70 \quad (2)$$

$$0.4f < |1/\Phi_3| < 0.7f, \Phi_3 < 0 \text{ (where } \Phi_3 = (n_2-1)\cdot r_3) \quad (3)$$

$$0.4f < |1/\Phi_8| < 0.6f, \Phi_8 < 0 \text{ (where } \Phi_8 = (n_5-n_4)/r_8) \quad (4)$$

$$0.2f < |f_{III}| < 0.4f, f_{III} < 0 \quad (5)$$

$$\nu_6 < 35, \nu_7 > 50 \quad (6)$$

where
f is the overall focal length; $f_I$ is the focal length of the first lens group; $f_{III}$ is the focal length of the third lens group; $n_i$ is the refractive index of the ith lens element at the d-line; $\nu_i$ is the Abbe number of the ith lens element; $r_3$ is the radius of curvature of the surface of the second lens element on the object side; $r_8$ is the radium of curvature of the cemented surface in the second lens group; $\Phi_3$ is the power of the surface of the second lens element on the object side; and $\Phi_8$ is the power of the cemented surface in the second lens group.

1 Claim, 8 Drawing Sheets

TELEPHOTO LENS SYSTEM

BACKGROUND OF THE INVENTION

1. Field of the Invention

The invention relates to a photographic telephoto lens system and, more particularly, to a compact high-performance telephoto lens system that has an aperture ratio of approximately 1:4 to 1:4.5, a half viewing angle of approximately 2 to 3° and a telephoto ratio of approximately 0.8.

2. Description of the Prior Art

Lens focusing is normally carried out by moving the entire lens system. However, where telephoto lens systems are employed, an internal focusing mechanism is widely used in view of the fact that the degree of movement of the center of gravity is small, and to improve the ease of handling; see, for example, JP-A-No. 58-82217 (the term "JP-A" as used herein means an "unexamined published Japanese patent application"), JP-A-No. 60-418 and JP-No. 62-24209).

As a result of the increased use of autofocusing mechanisms in cameras, the need has arisen to employ a simpler focusing lens group in order to reduce the load on the lens drive unit and thereby increase the focusing speed. However, conventional lens systems for autofocus cameras have had various problems such as a bulky and heavy focusing lens group, a bulky overall lens system, and a complicated focusing mechanism.

SUMMARY OF THE INVENTION

An object, therefore, of the invention is to provide a telephoto lens system that is compact (telephoto ratio of about 0.8) with a simple focusing mechanism (aperture ratio of about 1:4–1:4.5 and a half viewing angle of about 2°–3°) and at the same time ensures good performance over the range from infinity to a distance relatively close to the camera.

This object is attained by a telephoto lens system which has, in order from the object side, a first lens group having a positive refractive power, a second lens group having a smaller refractive power than the first lens group, a third lens group having a negative refractive power, and a fourth lens group having a positive refractive power. The first lens group is composed of a first positive lens element, a second negative lens element and a third positive lens element. The second lens group is a cemented lens having a fourth negative meniscus lens element and a fifth positive lens element. This fifth lens element is convex toward the object at the cemented surface. The third lens group includes a sixth positive lens element and a seventh negative lens element. Focusing is effected by moving the third lens group along the optical axis. The lens system of the invention satisfies the following conditions:

$$0.4f < f_I < 0.8f \quad (1)$$

$$\nu_1, \nu_3 > 70 \quad (2)$$

$$0.4f < |1/\Phi_3| < 0.7f, \Phi_3 < 0 \text{ (where } \Phi_3 = (n_2-1)/r_3) \quad (3)$$

$$0.4f < |1/\Phi_8| < 0.6f, \Phi_8 < 0 \text{ (where } \Phi_8 = (n_5-n_4)/r_8) \quad (4)$$

$$0.2f < |f_{III}| < 0.4f, f_{III} < 0 \quad (5)$$

$$\nu_6 < 35, \nu_7 > 50 \quad (6)$$

Where
- f: the overall focal length
- $f_I$: the focal length of the first lens group
- $f_{III}$: the focal length of the third lens group
- $n_i$: the refractive index of the ith lens element at the d-line
- $\nu_i$: the Abbe number of the ith lens element
- $r_3$: the radius of curvature of the surface of the second lens element on the object side
- $r_8$: the radius of curvature of the cemented surface in the second lens group
- $\Phi_3$: the power of the surface of the second lens element on the object side
- $\Phi_8$: the power of the cemented surface in the second lens group.

The third lens group is composed of a sixth positive lens element and a seventh negative lens element. As shown in the examples to be given later in this specification, this third lens group has a one-group-two-element or two-group-two-element composition. The fourth lens group is composed of a single positive lens element in the examples.

DETAILED DESCRIPTION OF THE INVENTION

The conditions to be satisfied by the telephoto lens system of the invention are described below in detail.

Conditions (1) to (3) are directed to the first lens group. Condition (1) relates to the power of the first lens group and should be satisfied in order to realize a compact overall system. If the upper limit of this condition is exceeded (i.e., the power of the first lens group is too weak), a sufficient telephoto ratio is not attained to achieve the desired compact system. If the lower limit of condition (1) is not achieved (i.e., the power of the first lens group is too strong), an undercompensated spherical aberration must be compensated by the rear lens groups. Furthermore, aberrational variations that occur during focusing at a distance relatively close to the camera will be too great to be properly compensated.

Condition (2) applies to the requirements which the optical material of the positive lens elements (first and third elements) in the first lens group should satisfy in order to minimize the chromatic aberration that will develop in these positive lens elements. If these positive lens elements are made of an optical material whose Abbe number is too small to satisfy condition (2), the achromatism that can be produced in the first lens group is insufficient to achieve the desired telephoto lens system.

Condition (3) applies to a requirement that should be satisfied by the surface of the second lens element on the object side, which has the greatest negative power in the first lens group. This surface ($r_3$) serves to compensate for the negative spherical aberration that will develop on account of the first and third positive lens elements. If the upper limit of condition (3) is exceeded (i.e., the negative power of the second lens element is too weak), undercompensation of spherical aberration will result. If the lower limit of condition (3) is not reached (i.e., the negative power of the second lens element is too strong), a condition favorable for aberrational compensation will result, but then an unduly large load will be exerted upon a single lens surface in order to achieve aberrational compensation. Large loads should be avoided since errors in that surface resulting from poor workmanship will cause substantial variation in lens performance.

Condition (4) should be satisfied by the second lens group so that the power of the cemented surface therein is properly adjusted so that this divergent surface minimizes the change in spherical aberration that may develop in response to the change in the distance from object. When focusing at an object located relatively close to the camera, a negative spherical aberration will be produced by the first lens group having a positive refractive power. However, in accordance with the invention, this negative spherical aberration is cancelled by a positive spherical aberration produced by the cemented surface of negative refractive power which is provided in the second lens group having a weak refractive power. Condition (4) sets forth the appropriate range of compensation for such spherical aberrations. If the lower limit of this condition is not reached (i.e., the power of the cemented surface ($r_8$) is too strong), undesired higher-order spherical aberrations will occur. If the upper limit of condition (4) is exceeded (i.e., the power of ($r_8$) is too weak), the second lens group is ineffective in compensating for the variation is spherical aberration that occurs in response to focusing on an object located close to the camera. The effectiveness of the second lens group is ensured irrespective of whether it has a positive or negative overall power as long as it includes a cemented surface having a negative power that satisfies condition (4).

Conditions (5) and (6) should be satisfied by the third lens group. Condition (5) sets forth the requirements for the power of the third lens group and the range of focusing which it effects. If the lower limit of this condition is not reached (i.e., the negative power of the third lens group is excessive), an undesired aberrational change will occur as a result of movement of the third lens group during focusing. If the upper limit of condition (5) is exceeded (i.e., the negative power of the third lens group is too weak), aberrational changes will decrease, but on the other hand, the necessary amount of movement of the third lens group to focus at an object located at a relatively close distance is increased, and focusing at a close distance is mechanically impossible without causing interference with other lens groups (the third lens group will contact other lens groups).

Condition (6) relates to the achromatism of the third lens group. If the positive lens element (sixth lens element)in this lens group is made of an optical material whose Abbe number is too great to satisfy condition (6), or if the negative lens element (seventh lens element) is made of an optical material whose Abbe number is too small to meet this condition, achromatism of the third lens group is insufficient to accomplish balanced compensation for chromatic aberration in the overall system owing to the movement of the third lens group during focusing. Since the positive lens element in the third lens group is made of an optical material having a small Abbe number, the refractive index of the third lens group can be sufficiently increased to minimize the Petzval sum and achieve effective compensation for curvature of the field.

EXAMPLES

Figure 1:
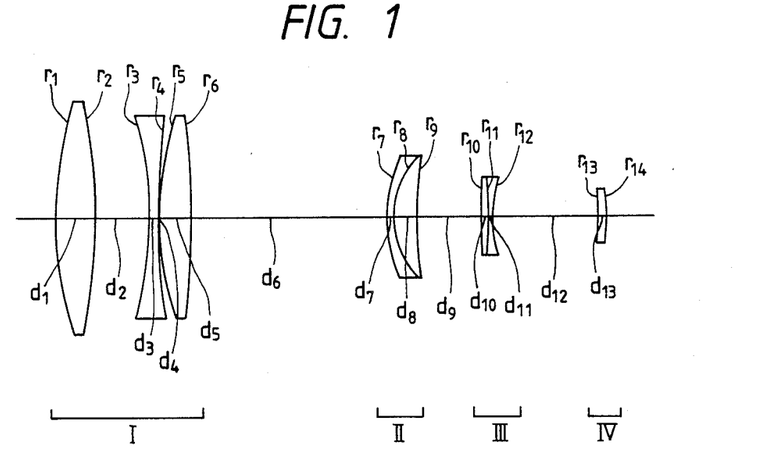
FIGS. 1, 3, 5, 7 and 9 are simplified cross-sectional views of the lens systems according to Examples 1, 2, 3, 4, and 5, respectively, of the present invention.
Figure 3:
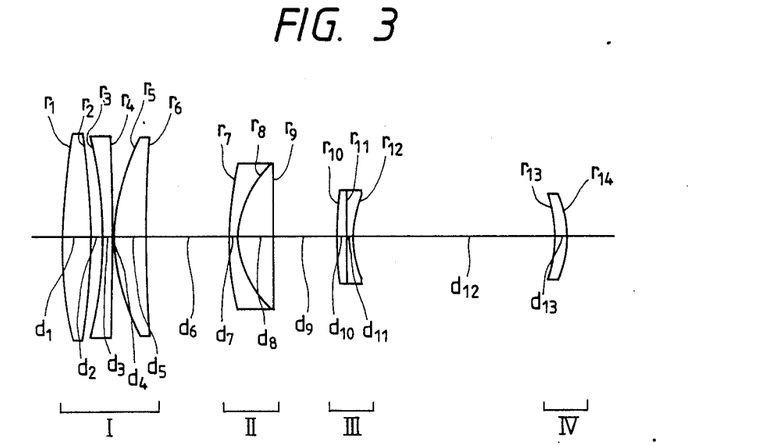
Figure 5:
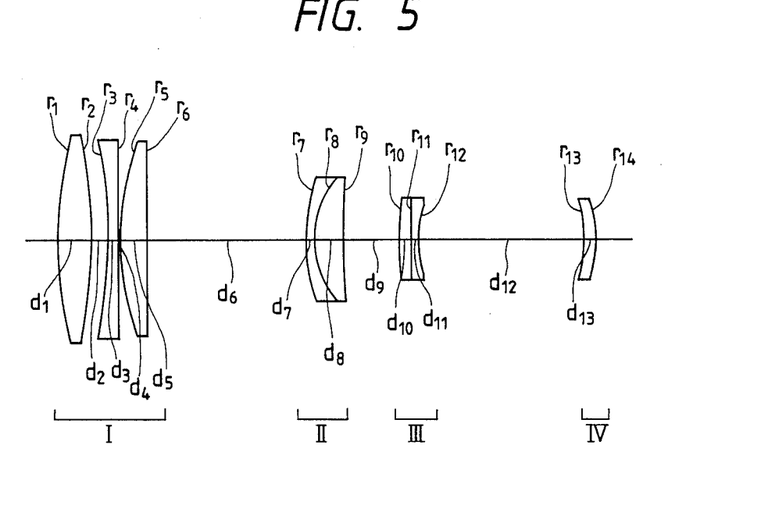
Figure 7:
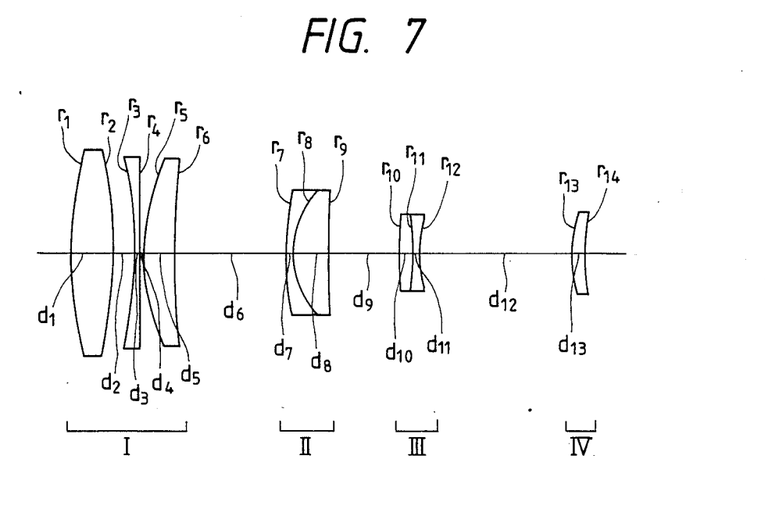
Figure 9:
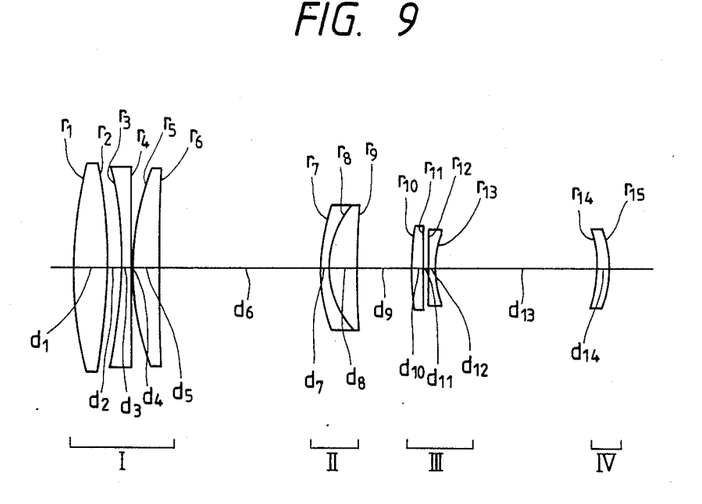

Examples 1–5 of the invention are described below and are illustrated in FIGS. 1, 3, 5, 7 and 9, respectively, wherein: $F_{NO}$ is an aperture ratio; f is focal length; $\omega$ is half viewing angle; $f_B$ is back focus; the telephoto ratio is the distance from the first lens surface to the image plane as divided by f; r is the radium of curvature of an individual lens surface; d is lens thickness or aerial lens distance; n is the refractive index of an individual lens element at the d-line; and $\nu$ is the Abbe number of an individual lens element.

EXAMPLE 1

Telephoto ratio=0.81

| | $F_{NO}$ = 1:4.0 $\omega$ = 2.1° | | f = 100.00 $f_B$ = 22.29 | |
|---|---|---|---|---|
| Surface NO. | r | d | n | $\nu$ |
| 1 | 39.513 | 4.12 | 1.49700 | 81.6 |
| 2 | −61.263 | 5.68 | | |
| 3 | −38.800 | 1.02 | 1.74320 | 49.3 |
| 4 | 74.986 | 0.17 | | |
| 5 | 33.257 | 3.38 | 1.49700 | 81.6 |
| 6 | −74.428 | 21.09 | | |
| 7 | 14.955 | 0.76 | 1.69350 | 53.2 |
| 8 | 8.818 | 2.46 | 1.48749 | 70.2 |
| 9 | 37.668 | 7.03 | | |
| 10 | −51501.726 | 0.67 | 1.78472 | 25.7 |
| 11 | −50.118 | 0.51 | 1.58913 | 61.2 |
| 12 | 13.345 | 11.34 | | |
| 13 | −27.743 | 0.85 | 1.59270 | 35.3 |
| 14 | −19.183 | | | |

$f_I$=71.70
$1/\Phi_3$=−53.57
$1/\Phi_8$=−42.80
$f_{III}$=−24.87
When focused at a distance 10 times the focal length;
$d_9$=9.97
$d_{12}$=8.40

EXAMPLE 2

Telephoto ratio=0.77

| | $F_{NO}$ = 1:4.5 $\omega$ = 3.2° | | f = 100.00 $f_B$ = 22.60 | |
|---|---|---|---|---|
| Surface No. | r | d | n | $\nu$ |
| 1 | 46.089 | 3.33 | 1.49700 | 81.6 |
| 2 | −64.992 | 1.17 | | |
| 3 | −47.961 | 1.03 | 1.74320 | 49.3 |
| 4 | −1499.173 | 0.26 | | |
| 5 | 21.802 | 3.56 | 1.49700 | 81.6 |
| 6 | 174.386 | 8.85 | | |
| 7 | 29.561 | 0.90 | 1.72000 | 50.2 |
| 8 | 10.012 | 3.85 | 1.48749 | 70.2 |
| 9 | 126.695 | 6.90 | | |
| 10 | 46.586 | 0.99 | 1.78472 | 25.7 |
| 11 | 204.972 | 0.77 | 1.60311 | 60.7 |
| 12 | 12.672 | 21.45 | | |
| 13 | −12.361 | 1.28 | 1.76182 | 26.5 |
| 14 | −11.867 | | | |

$f_I$=43.33

$1/\Phi_3 = -64.53$
$1/\Phi_8 = -43.06$
$f_{III} = -32.45$
When focused at a distance 10 times the focal length;
$d_9 = 9.50$
$d_{12} = 18.85$

EXAMPLE 3

Telephoto ratio = 0.77

| | $F_{NO} = 1:4.5$ | | $f = 100.00$ | |
| | $\omega = 3.2°$ | | $f_B = 19.23$ | |
| Surface No. | r | d | n | $\nu$ |
| --- | --- | --- | --- | --- |
| 1 | 42.686 | 3.63 | 1.49700 | 81.6 |
| 2 | −53.980 | 1.77 | | |
| 3 | −49.641 | 1.03 | 1.78590 | 44.2 |
| 4 | 350.314 | 0.26 | | |
| 5 | 30.102 | 2.70 | 1.49700 | 81.6 |
| 6 | 266.138 | 17.15 | | |
| 7 | 19.911 | 0.90 | 1.69350 | 53.2 |
| 8 | 10.032 | 3.18 | 1.48749 | 70.2 |
| 9 | 62.429 | 5.95 | | |
| 10 | 36.343 | 1.28 | 1.76182 | 26.5 |
| 11 | 465.854 | 0.77 | 1.69680 | 55.5 |
| 12 | 11.548 | 17.79 | | |
| 13 | −12.821 | 1.28 | 1.64769 | 33.8 |
| 14 | −11.732 | | | |

$f_I = 43.33$
$1/\Phi_3 = -63.16$
$1/\Phi_8 = -48.70$
$f_{III} = -32.45$
When focused at a distance 1 times the focal length;
$d_3 = 8.48$
$d_{12} = 15.26$

EXAMPLE 4

Telephoto ratio = 0.77

| | $F_{NO} = 1:4.5$ | | $f = 100.00$ | |
| | $\omega = 3.2°$ | | $f_B = 21.62$ | |
| Surface No. | r | d | n | $\nu$ |
| --- | --- | --- | --- | --- |
| 1 | 43.072 | 4.61 | 1.49700 | 81.6 |
| 2 | −51.503 | 2.30 | | |
| 3 | −45.900 | 0.74 | 1.78590 | 44.2 |
| 4 | −415.271 | 0.26 | | |
| 5 | 22.772 | 3.44 | 1.43425 | 95.0 |
| 6 | 97.851 | 12.08 | | |
| 7 | 30.633 | 0.90 | 1.69350 | 53.2 |
| 8 | 10.344 | 3.85 | 1.48749 | 70.2 |
| 9 | 121.197 | 7.53 | | |
| 10 | 296.177 | 1.28 | 1.80518 | 25.4 |
| 11 | −28.276 | 0.77 | 1.66672 | 48.3 |
| 12 | 14.937 | 16.27 | | |
| 13 | 15.898 | 1.28 | 1.58267 | 46.4 |
| 14 | 21.369 | | | |

$f_I = 48.79$
$1/\Phi_3 = -58.40$
$1/\Phi_8 = -50.21$
$f_{III} = -27.18$
When focused at a distance 10 times the focal length;
$d_3 = 10.45$
$d_{12} = 13.35$

EXAMPLE 5

Telephoto ratio = 0.77

| | $F_{NO} = 1:4.5$ | | $f = 100.00$ | |
| | $\omega = 3.2°$ | | $f_B = 19.23$ | |
| Surface No. | r | d | n | $\nu$ |
| --- | --- | --- | --- | --- |
| 1 | 44.513 | 3.60 | 1.49700 | 81.6 |
| 2 | −53.637 | 1.43 | | |
| 3 | −48.905 | 1.03 | 1.78590 | 44.2 |
| 4 | 289.532 | 0.26 | | |
| 5 | 28.878 | 2.88 | 1.49700 | 81.6 |
| 6 | 328.636 | 17.52 | | |
| 7 | 19.938 | 0.90 | 1.69350 | 53.2 |
| 8 | 9.779 | 3.00 | 1.48749 | 70.2 |
| 9 | 60.730 | 5.84 | | |
| 10 | 33.010 | 1.28 | 1.76182 | 26.5 |
| 11 | 565.744 | 0.54 | | |
| 12 | −1371.341 | 0.64 | 1.69680 | 55.5 |
| 13 | 11.602 | 17.50 | | |
| 14 | −11.960 | 1.28 | 1.56444 | 43.8 |
| 15 | −10.927 | | | |

Figure 2A:
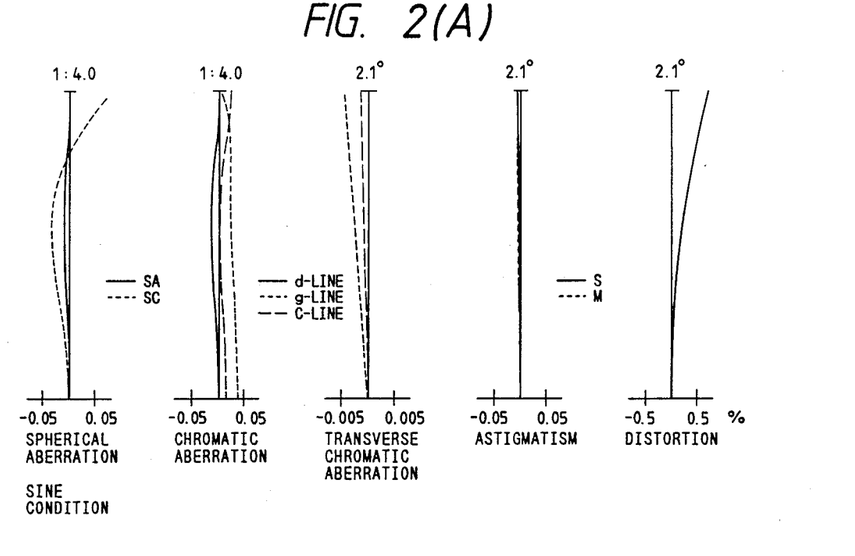
FIGS. 2(A), 4(A), 6(A), 8(A) and 10(A) are graphs plotting the aberration curves obtained with the lens systems of Examples 1, 2, 3, 4, and 5, respectively, when they are focused at infinity.
Figure 2B:
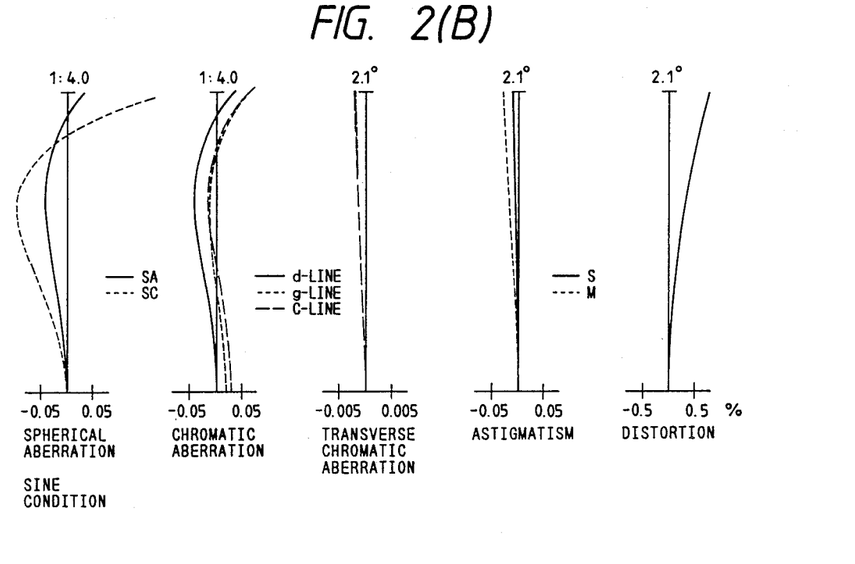
FIGS. 2(B), 4(B), 6(B) and 10(B) are graphs plotting the aberration curves obtained with the lens systems of Examples 1–5 when they are focused at a distance which is relatively close to the camera (10 times the focal length).
Figure 4A:
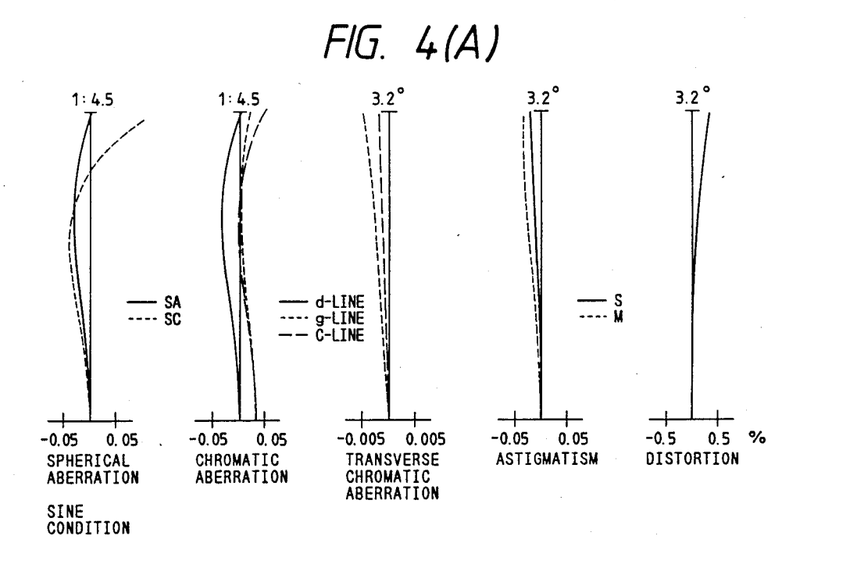
Figure 4B:
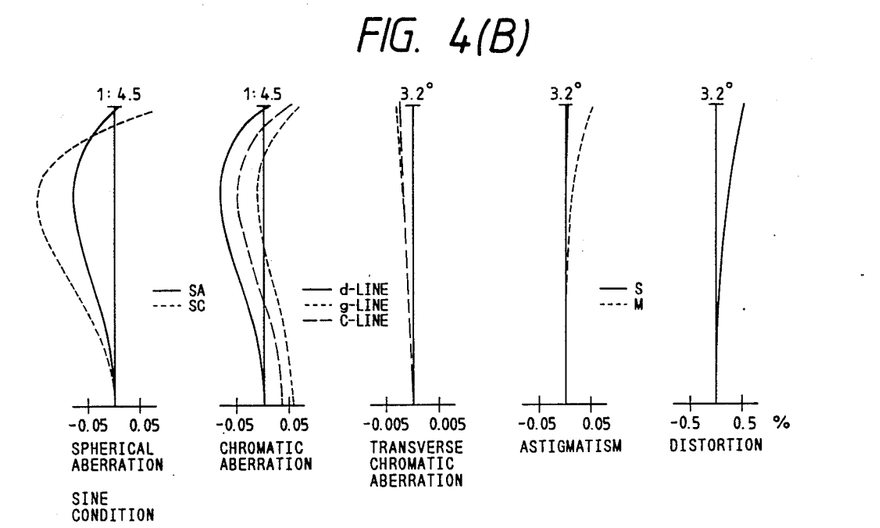
Figure 6A:
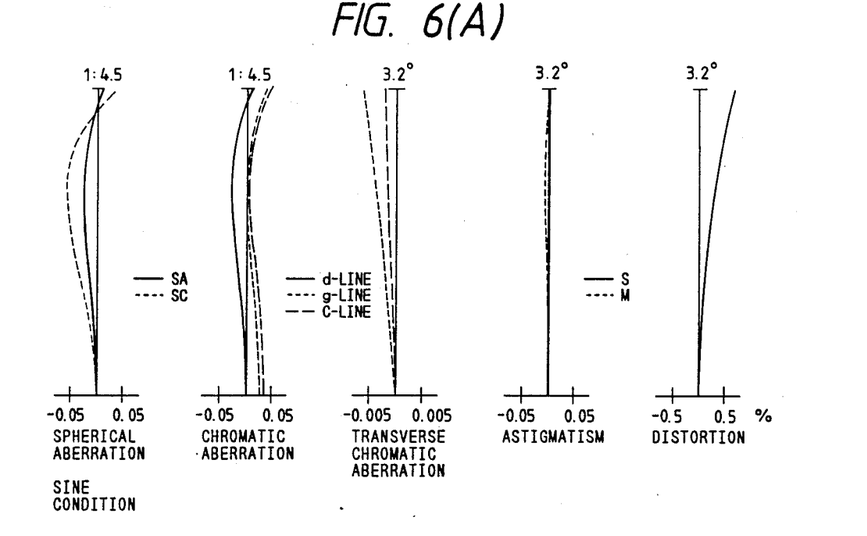
Figure 6B:
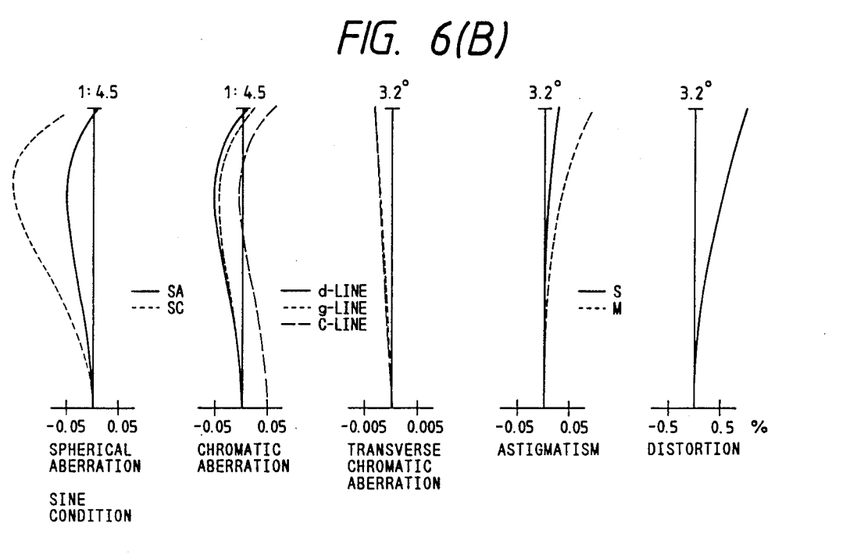
Figure 8A:
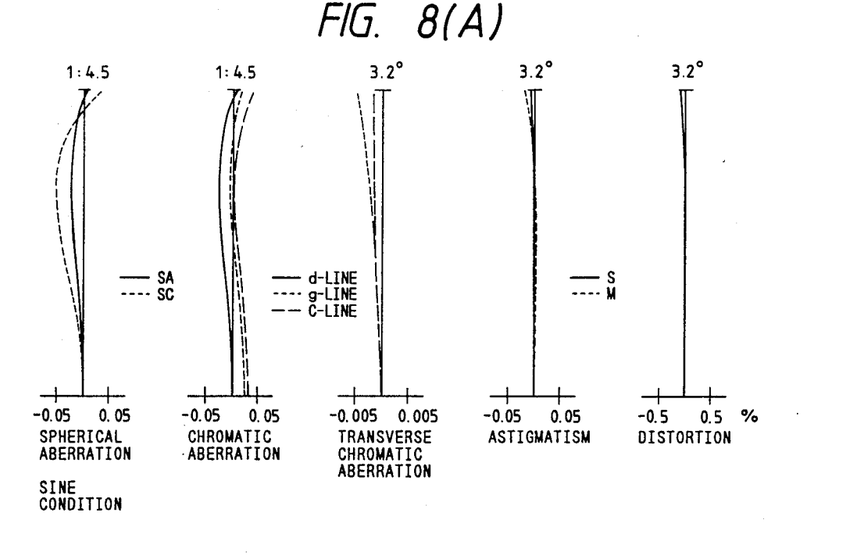
Figure 8B:
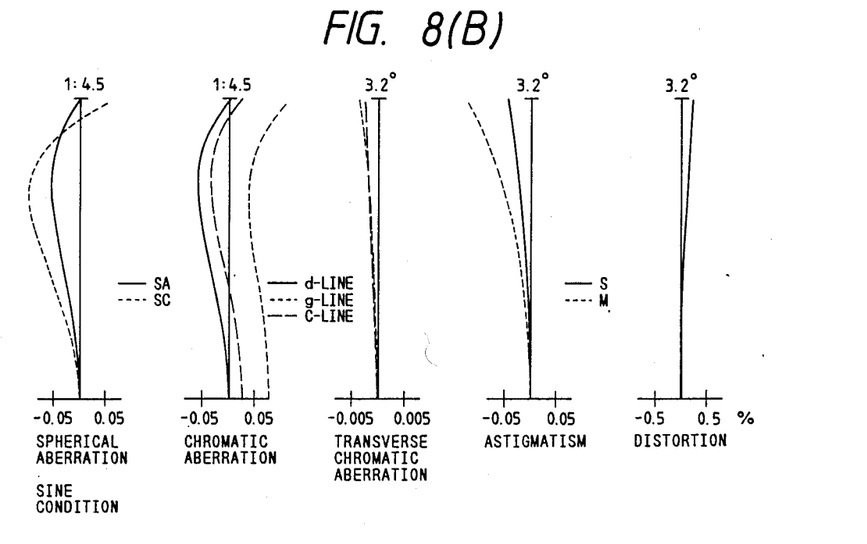
Figure 10A:
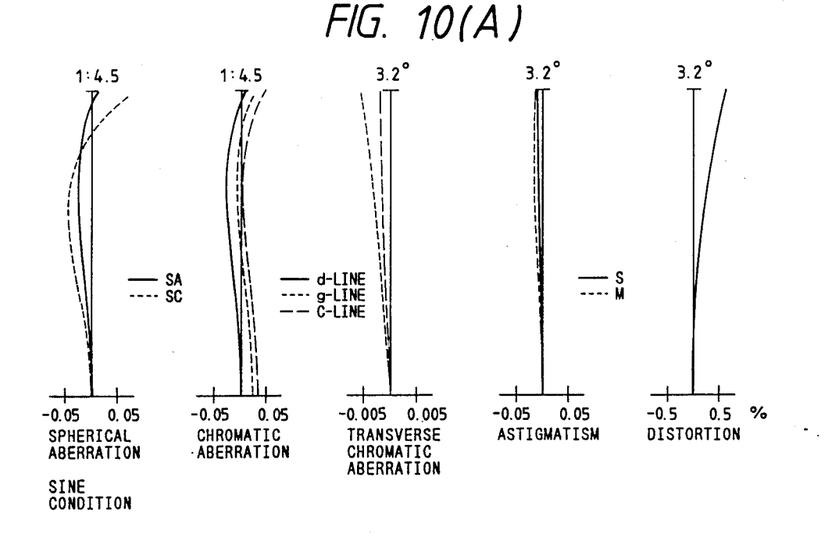
Figure 10B:
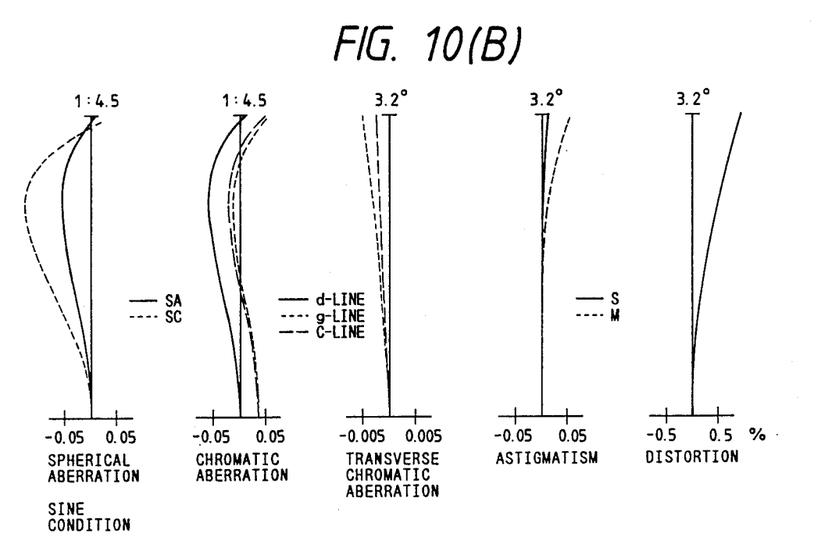

$f_I = 57.89$
$1/\Phi_3 = -62.23$
$1/\Phi_8 = -47.47$
$f_{III} = -27.32$
When focused at a distance 10 times the focal length;
$d_9 = 8.56$
$d_{13} = 14.78$ As described above, the internal focusing telephoto lens system of the invention performs focusing by moving the third lens group and is designed to satisfy conditions (1)–(6) set forth herein. As a result, this lens system is fairly compact (zoom ratio of approximately 0.8) considering its aperture ratio of the order of 1:4–1:4.5 and a half viewing angle of about 2°–3° (f=400–600 mm when calculated for a 35-mm size). In spite of this compactness, the telephoto lens system of the invention ensures good performance over the range of from infinity to a near distance as is apparent from the accompanying graphs plotting the aberration curves obtained with various versions of the system (FIGS. 2(A), 2(B), 4(A), 4(B), 6(A), 6(B), 8(A), 8(B), 10(A) and 10(B)).

What is claimed is:

1. A telephoto lens system comprising, in order from an object side along an optical axis, a first lens group having a positive refractive power, a second lens group having a smaller refractive power than the first lens group, a third lens group having a negative refractive power, and a fourth lens group having a positive refractive power;

said first lens group comprising a first positive lens element, a second negative lens element and a third positive lens element;

said second lens group being a cemented lens comprising a fourth negative meniscus lens element and a fifth positive lens element, said cemented surface of said second lens group being convex toward said object;

said third lens group comprising a sixth positive lens element and a seventh negative lens element;

wherein focusing is effected by moving said third lens group along said optical axis, said lens system further satisfying the following conditions:

$$0.4f < f_I < 0.8f \quad (1)$$

$$\nu_1, \nu_3 > 70 \quad (2)$$

$$0.4f < |1/\Phi_3| < 0.7f, \Phi_3 < 0 \text{ (where } \Phi_3 = (n_2-1)/r_3) \quad (3)$$

$$0.4f < |1/\Phi_8| < 0.6f, \Phi_8 < 0 \text{ )where } \Phi_8 = (n_5-n_4)/r_8) \quad (4)$$

$$0.2f < |f_{III}| < 0.4f, \quad f_{III} < 0 \quad (5)$$

$$\nu_6 < 35, \quad \nu_7 > 50 \quad (6)$$

where f: the overall focal length $f_I$: the focal length of said first lens group $f_{III}$: the focal length of said third lens group $n_i$: the refractive index of an ith lens element at the d-line $\nu_i$: the Abbe number of an ith lens element $r_3$: the radius of curvature of a surface of the second lens element on said object side $r_8$: the radius of curvature of said cemented surface in said second lens group $\Phi_3$: the power of a surface of the second lens element on said object side $\Phi_8$: the power of said cemented surface in said second lens group.

* * * * *